Figure 1:
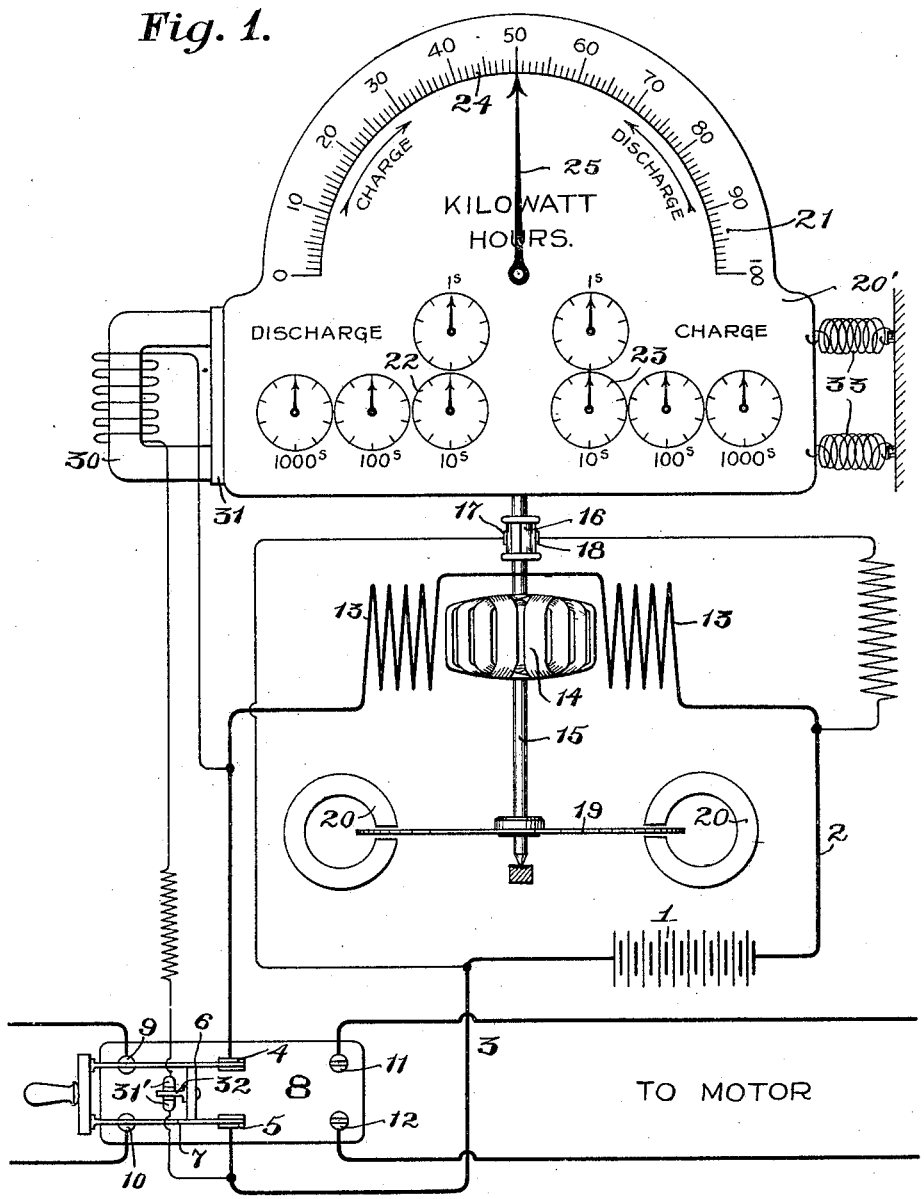

No. 769,988. PATENTED SEPT. 13, 1904.
T. DUNCAN.
ELECTRIC METER.
APPLICATION FILED JULY 18, 1901.
NO MODEL. 2 SHEETS—SHEET 1.

WITNESSES:
Max W. Zabel.
Harvey L. Hanson.

INVENTOR.
Thomas Duncan
BY Charles A. Brown Cragg & Belfield
ATTORNEYS.

No. 769,988. PATENTED SEPT. 13, 1904.
T. DUNCAN.
ELECTRIC METER.
APPLICATION FILED JULY 18, 1901.
NO MODEL. 2 SHEETS—SHEET 2.
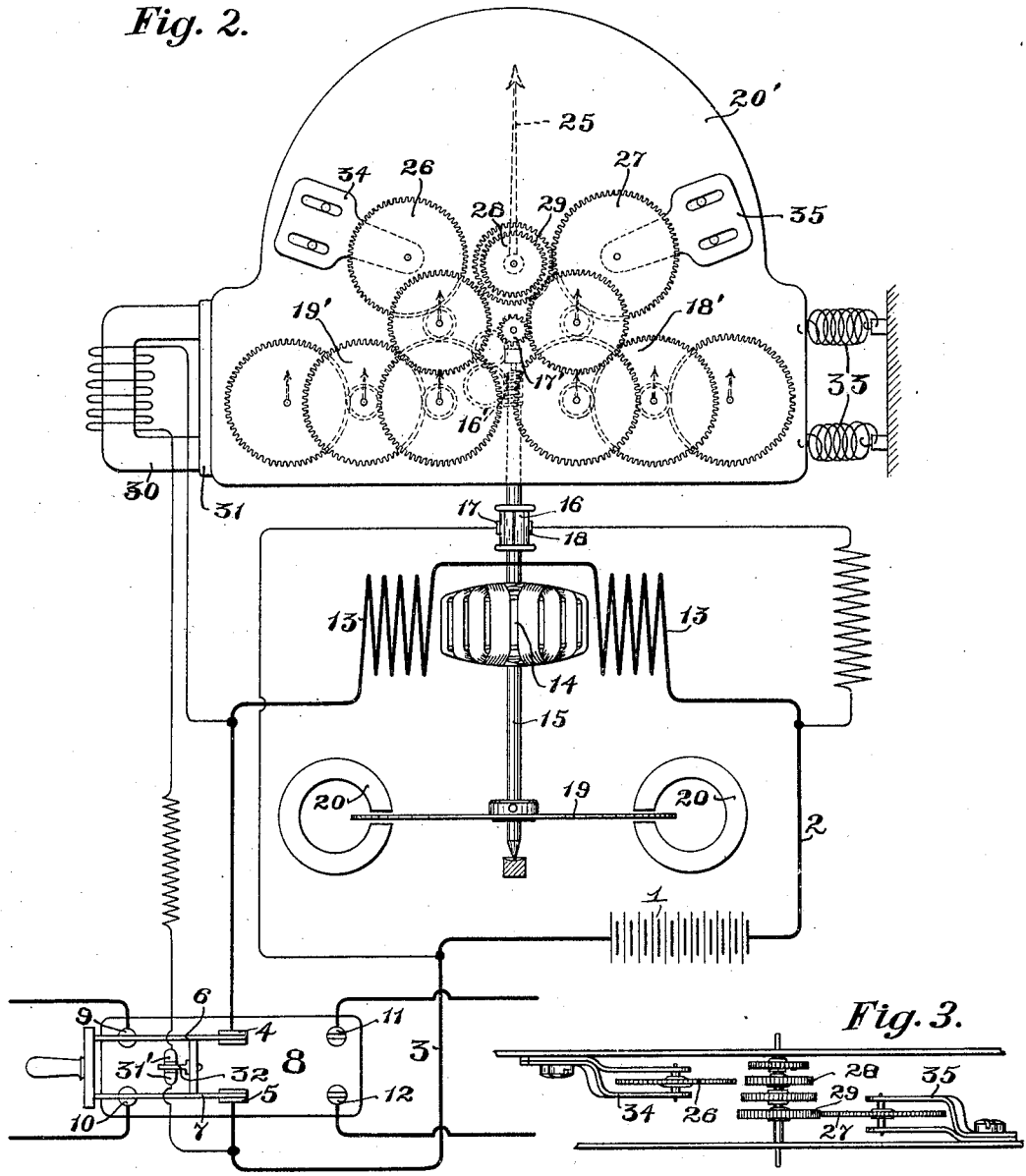
WITNESSES:
INVENTOR.
Thomas Duncan
By Charles A. Brown Cragg & Belfield
ATTORNEYS.

No. 769,988. Patented September 13, 1904.

UNITED STATES PATENT OFFICE.

THOMAS DUNCAN, OF CHICAGO, ILLINOIS.

ELECTRIC METER.

SPECIFICATION forming part of Letters Patent No. 769,988, dated September 13, 1904.

Application filed July 18, 1901. Serial No. 68,760. (No model.)

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to storage-battery meters, and is especially useful in connection with vehicle-meters, but it is not to be limited to this use.

The invention has the following objects: first, means for indicating when the battery is charged; second, means for indicating when the battery is discharged to the proper limit; third, means for indicating the actual amount of energy delivered to the battery in charging it successively during any period of time; fourth, means for cumulatively integrating the actual amount of energy delivered or given out by the battery during several discharges, so as to obtain an actual comparison between charge and discharge; fifth, means for compensating for inefficiencies of different makes of batteries in discharging.

I will point out my invention in the appended claims and will fully describe the same in connection with the accompanying drawings, in which—

Figure 1 is a diagrammatic view of a meter constructed in accordance with my invention, indicating its circuit relations with the storage battery and the switch for connecting the storage battery with the translating means and the charging-machine. Fig. 2 is a view similar to Fig. 1, the indicating-dial being removed. Fig. 3 is a plan view of counting-trains entering into the preferred embodiment of the invention.

Like parts are indicated by similar characters of reference throughout the different figures.

A storage battery 1 is provided with mains 2 and 3, terminating in pivotal mountings 4 and 5, that support the blades 6 and 7 of a circuit-changing switch 8, employed for connecting the storage battery with the translating means or the charging-machine. The conductors leading to the charging-machine are provided with terminal contacts 9 10, adapted for connection with the blades 6 and 7 when the switch is thrown to the left, as indicated, whereupon the battery may be charged. When the battery has been fully charged, the switch 8 is thrown to the right to bring the blades 6 and 7 into contact with the terminals 11 and 12 of the conductors leading to the translating means.

The motor element of the meter is provided with a current-winding subdivided into coils 13 13, and a pressure-winding 14, adapted for inclusion in bridge of the storage-battery mains or leads. The pressure-winding 14 is preferably in the form of an armature-winding mounted upon a rotatable shaft 15, upon which is placed a commutator 16, engaging commutator-brushes 17 and 18. The lower end of the shaft is provided with a damping-disk 19, arranged within the fields of permanent magnets 20 20. The upper end of the spindle or shaft 15 is provided with a worm 16', that operates the pinion 17', which in turn is adapted to actuate one or the other of the counting-trains 18' and 19', according to the adjustment of the frame 20', supporting the said counting-trains with respect to the meter-shaft, which is preferably mounted in fixed bearings. The frame 20' supports a reading-dial 21, upon which are provided totalizing measuring-indexes 22 and 23, operated by the counting-trains 19' and 18', respectively. A semicircular reading-scale 24 is also provided upon the dial 21, upon which scale the needle 25 may be moved in a clockwise direction as the battery is being charged and in a contra-clockwise direction as the battery is discharging. The scale 24 is used in connection with each charging of the storage battery, while the totalizing measuring devices 22 and 23 are employed to effect cumulative measurements of energy supplied to and discharged from the storage battery. The measuring-indexes of the devices 22 and 23 are operated at the same rates of speed per unit of load or energy, so that the mechanism 22 may indicate cumulatively the output of the battery during several discharges, while the mechanism 23 may cumulatively indicate the total quantity of energy supplied to the storage battery in several charges. Thus the efficiency of the particular battery in service may be readily ascertained by comparison between the readings of the mechanisms 22 and 23. In order that the user may determine the amount of energy that has been supplied to or that remains within the storage battery, the needle or index 25 is employed and is caused to rotate at an increased rate of speed per unit of load or energy when the battery is discharging, which operation of the needle occurs when the measuring mechanism 22 is operated. When the battery is being charged, the counting mechanism 23 and the needle 25 are being simultaneously actuated, the needle 25 then moving at a slower rate of speed per unit of load or energy. To cause the needle 25 to operate at these different rates of speed while the counting-trains 18' and 19' are operated at uniform rates of speed, I provide in addition to the counting-trains gearing interposed or adapted for interposition between the needle and the said counting-trains. This interposed gearing is preferably in the form of wheels 26 27, constituting additions to the trains 19' and 18', and wheels 28 and 29, mounted upon the shaft of the needle 25. The wheels 26 and 28 serve when engaged to rotate the needle 25 in a contra-clockwise direction to indicate discharge, while the wheels 27 and 29 rotate the needle 25 to indicate the charge, the wheels 27 and 29 serving to operate the needle 25 at a slower rate of speed than the wheels 26 and 28 to compensate for battery loss. The frame 20' is mounted to move transversely to the shaft of the meter to effect the engagement of the pinion 17' with one or the other of the counting-trains 18' and 19'. The said frame is moved to the left when the storage battery is being charged to bring the pinion 17' into engagement with the counting-train 18' and to effect engagement between the wheels 27 and 29 to cause the instrument to measure the energy supplied to the battery both by the operation of the measuring mechanism 23 and the indicator 25, which then moves in a clockwise direction. When the battery is discharging, the pinion 17' is brought into connection with the counting-train 19', while the wheels 26 and 28 are also engaged to cause the meter to totalize energy given out in several discharges by the operation of the mechanism 22 and to indicate the energy that was left in the battery after a single discharge by the movement of the needle 25 in a contra-clockwise direction. To effect this result, I prefer to employ an electromagnet 30, whose armature 31 is carried upon the frame 20' and whose winding is adapted for inclusion in bridge of the storage-battery mains when the switch 8 is operated to connect the storage battery with the charging-machine. To include the winding of the magnet 30 in circuit, I prefer to provide the bridge-conductor, including the winding of the magnet 30, with terminals 31' 31', that are electrically connected by a supplemental blade 32, carried by the switch 8, when the said switch is thrown to the left. When the battery has been charged, the switch 8 is thrown to the right to connect the translating means in circuit with the battery, whereupon the supplemental blade 32 is removed from connection with the contacts 31' 31', whereupon the magnet 30 is deënergized, so that the springs 33, provided upon the right-hand side of the frame 20', may cause the said frame to move toward the right to break engagement between the pinion 17' and the counting-train 18' and also between the wheels 27 and 29 and effect engagement between the pinion 17' and the counting-train 19' and also the wheels 26 and 28.

The relation of the gearing is more clearly illustrated in Fig. 2.

The teeth of the wheel 28 may be varied in accordance with the efficiency of the battery. For example, if the wheel 29 has one hundred teeth and the battery an efficiency of only eighty per cent., then the wheel 28 may have eighty teeth, (assuming the wheels 26 and 27 have the same number of teeth.) By this arrangement when eighty per cent. of the energy put into the battery has been taken out the pointer 25 will indicate that the battery is sufficiently discharged and ready for recharging, whereby the danger of over-discharging the battery may be avoided.

All of the gear-trains move in response to the operation of the magnet 30 and the springs 33, with the exception of the wheels 17', 28, and 29. The wheels 26 and 27 may be provided with adjustable mountings 34 and 35, whereby the position of the said wheels may be readily adjusted toward or from corresponding wheels 28 and 29.

If it is desired, a number of wheels 28, having different numbers of teeth corresponding to different battery efficiencies, may be provided. That one to be associated with the wheel 26 corresponds with the efficiency of the particular battery in service.

While I have herein shown and particularly described the preferred embodiment of my invention, it is obvious that changes may readily be made without departing from the spirit thereof, and I do not wish, therefore, to be limited to the precise disclosures herein set forth; but,

Having thus described my invention, I claim as new and desire to secure by Letters Patent—

1. The combination with a storage battery, of a switch for effecting connection of the storage battery with the charging source of current or the translating means, an integrating counting mechanism to measure energy supplied to the storage battery, a second integrating counting mechanism to measure the energy discharged by the storage battery, motor means for operating the said integrating counting mechanism, means whereby but one of the said integrating mechanisms is operated at a time, according to the association of the battery with the charging source of current or the translating means, to enable a comparison between the energy supplied to the battery and discharged therefrom, and an indicating device for indicating the energy supplied to the battery upon each charge and the energy remaining in the battery during each discharge, substantially as described.

2. The combination with a storage battery, of a switch for effecting connection of the storage battery with the charging source of current or translating means, an integrating counting mechanism to measure energy supplied to the storage battery, a second integrating counting mechanism to measure energy discharged by the storage battery, motor means for operating the said integrating counting mechanisms, means whereby but one of the said integrating mechanisms is operated at a time, according to the association of the battery with the charging source of current or the translating means, to enable a comparison between the energy supplied to the battery and discharged therefrom, an indicating device for indicating the energy supplied to the battery upon each charge and the energy remaining in the battery during each discharge, and an operative connection between the said motor means and the said indicating device to effect the actuation of the indicating device, substantially as described.

3. The combination with a storage battery, of a switch for effecting connection of the storage battery with the charging source of current or the translating means, an integrating counting mechanism to measure energy supplied to the storage battery, a second integrating counting mechanism to measure energy discharged by the storage battery, motor means, having a single rotating meter element, for operating the said integrating counting mechanisms, means whereby but one of the said integrating mechanisms is operated at a time, according to the association of the battery with the charging source of current or the translating means, to enable a comparison between the energy supplied to the battery and discharged therefrom, and an indicating device for indicating the energy supplied to the battery during each charge and the energy remaining in the battery during each discharge, substantially as described.

4. The combination with a storage battery, of a switch for effecting connection of the storage battery with the charging source of current or the translating means, an integrating counting mechanism to measure energy supplied to the storage battery, a second integrating counting mechanism to measure energy discharged by the storage battery, motor means, having a single rotating meter element, for operating the said integrating counting mechanisms, means whereby but one of the said integrating mechanisms is operated at a time, according to the association of the battery with the charging source of current or the translating means, to enable a comparison between the energy supplied to the battery and discharged therefrom, an indicating device for indicating the energy supplied to the battery during each charge and the energy remaining in the battery during each discharge, and an operative connection between the said motor means and the said indicating device to effect the actuation of the indicating device, substantially as described.

5. The combination with a storage battery, of a switch for effecting connection of the storage battery with the charging source of current or the translating means, an integrating mechanism to measure energy supplied to the storage battery, a second integrating counting mechanism to measure energy discharged by the storage battery, a motor meter element receiving current passing through the storage battery, means for shifting the engagement of the said motor element from one integrating mechanism to the other, whereby but one of said integrating mechanisms is operated at a time, according to the association of the battery with the charging source of current or the translating means, to enable a comparison between the energy supplied to the battery and discharged therefrom, and an indicating element in constant engagement with the motor meter element, substantially as described.

6. The combination with a storage battery, of a switch for effecting connection of the storage battery with the charging source of current or the translating means, an integrating counting mechanism to measure energy supplied to the storage battery, a second integrating counting mechanism to measure energy discharged by the storage battery, a motor meter element receiving current passing through the storage battery, means for shifting the engagement of the said motor element from one integrating mechanism to the other, whereby but one of said integrating mechanisms is operated at a time, according to the association of the battery with the charging source of current or the translating means, to enable a comparison between the energy supplied to the battery and discharged therefrom, an indicating element in constant engagement with the motor meter element, and means interposed between the indicating element and the motor meter element, whereby the said indicating element will operate at an increased rate of speed per unit of load or energy, while the battery is discharging, and at a decreased rate of speed per unit of load or energy while the battery is being charged, to compensate for battery loss, substantially as described.

7. The combination with a storage battery, of a switch for effecting connection of the storage battery with the charging source of current or the translating means, an integrating counting mechanism including a wheel-train to measure energy supplied to the storage battery, a second integrating counting mechanism including a wheel-train to measure energy discharged by the storage battery, a motor meter element receiving current passing through the storage battery, means for shifting the engagement of the said motor element from one of said wheel-trains to the other, whereby but one of said integrating mechanisms is operated at a time, according to the association of the battery with the charging source of current or the translating means, to enable a comparison between the energy supplied to the battery and discharged therefrom, an indicating element in engagement with the motor meter element, and gearing interposed between the indicating element and the motor meter element, whereby the said indicating element will operate at an increased rate of speed per unit of load or energy while the battery is discharging and at a decreased rate of speed per unit of load or energy while the battery is being charged, to compensate for battery loss, substantially as described.

8. The combination with a storage battery, of a switch for effecting connection of the storage battery with the charging source of current or the translating means, an integrating counting mechanism including a wheel-train to measure energy supplied to the storage battery, a second integrating counting mechanism including a wheel-train to measure energy discharged by the storage battery, a motor meter element receiving current passing through the storage battery, means for effecting engagement between the motor meter element and one of the said wheel-trains, an electromagnet for effecting engagement between the said motor meter element and the other of the said wheel-trains, and switching mechanism for closing circuit through the said electromagnet, substantially as described.

9. The combination with a storage battery, of a switch for effecting connection of the storage battery with the charging source of current or the translating means, an integrating counting mechanism including a wheel-train to measure energy supplied to the storage battery, a second integrating counting mechanism including a wheel-train to measure energy discharged by the storage battery, a motor meter element receiving current passing through the storage battery, spring mechanism for effecting engagement between the motor meter element and one of the said wheel-trains, an electromagnet for effecting engagement between the said motor meter element and the other of the said wheel-trains, and switching mechanism for closing circuit through the said electromagnet, substantially as described.

10. The combination with a storage battery, of a switch for effecting connection of the storage battery with the charging source of current or the translating means, an integrating counting mechanism including a wheel-train to measure energy supplied to the storage battery, a second integrating counting mechanism including a wheel-train to measure energy discharged by the storage battery, a motor meter element receiving current passing through the storage battery, means for effecting engagement between the motor meter element and one of the said wheel-trains, an electromagnet for effecting engagement between the said motor meter element and the other of the said wheel-trains, switching mechanism for closing circuit through the said electromagnet, an indicating element in engagement with the motor meter element, and gearing interposed between the indicating element and the motor meter element, whereby the said indicating element will operate at an increased rate of speed per unit of load or energy while the battery is discharging and at a decreased rate of speed per unit of load or energy while the battery is being charged to compensate for battery loss, substantially as described.

11. The combination with a storage battery, of a switch for effecting connection of the storage battery with the charging source of current or the translating means, an integrating counting mechanism including a wheel-train to measure energy supplied to the storage battery, a second integrating counting mechanism including a wheel-train to measure energy discharged by the storage battery, a motor meter element receiving current passing through the storage battery, spring mechanism for effecting engagement between the motor meter element and one of the said wheel-trains, an electromagnet for effecting engagement between the said motor meter element and the other of the said wheel-trains, switching mechanism for closing circuit through the said electromagnet, an indicating element in engagement with the motor meter element, a gearing interposed between the indicating element and the motor meter element, whereby the said indicating element will operate at an increased rate of speed per unit of load or energy while the battery is discharging, and at a decreased rate of speed per unit of load or energy while the battery is being charged, to compensate for battery loss, substantially as described.

12. In a storage-battery meter, the combination with the motor element thereof, of an indicator operated thereby, gearing interposed between the motor element and the indicator, whereby the said indicator may operate at an increased rate of speed per unit of load or energy while the battery is discharging and at a reduced rate of speed per unit of load or energy while the battery is being charged, to compensate for battery loss, and means for controlling the relation of the motor meter element to the said gearing, substantially as described.

13. The combination with a storage battery, of a switch for effecting connection of the storage battery with the charging source of current or the translating means, an integrating counting mechanism to measure energy supplied to the storage battery, a second integrating counting mechanism to measure energy discharged by the storage battery, motor means for operating the said integrating counting mechanisms, means whereby but one of said integrating mechanisms is operated at a time, according to the association of the battery with the charging source of current or the translating means, to enable a comparison between the energy supplied to the battery and discharged therefrom, and an indicating device for indicating the degree of charge or discharge of the battery, substantially as described.

14. The combination with a storage battery, of a switch for effecting connection of the storage battery with the charging source of current or the translating means, an integrating counting mechanism to measure energy supplied to the storage battery, a second integrating counting mechanism to measure energy discharged by the storage battery, motor means for operating the said integrating counting mechanisms, means whereby but one of said integrating mechanisms is operated at a time, according to the association of the battery with the charging source of current or the translating means, to enable a comparison between the energy supplied to the battery and discharged therefrom, and an indicating device for indicating the per cent. of available energy remaining in the storage battery, substantially as described.

15. The combination with a circuit in which currents may flow in either one direction or the other, of an integrating counting mechanism to measure the energy flowing through said circuit in one direction, a second integrating counting mechanism to measure the energy flowing in said circuit in the opposite direction, motor means for operating the said integrating counting mechanisms, means whereby but one of the said integrating counting mechanisms is operated at a time according to the direction in which a current is flowing in said circuit, to enable a comparison between the energy flowing through the circuit in one direction and that flowing through the circuit in the opposite direction, and an indicating device for indicating the energy flowing through said circuit in one direction for a given length of time, substantially as described.

16. The combination with a storage battery, of an integrating counting mechanism to measure energy supplied to the storage battery, a second integrating counting mechanism to measure the energy discharged by the storage battery, motor means for operating the said integrating counting mechanism, means whereby but one of the said integrating mechanisms is operated at a time, according to the association of the battery with the charging source of current or the translating means, to enable a comparison between the energy supplied to the battery and discharged therefrom, and an indicating device for indicating the energy supplied to the battery upon each charge and the energy remaining in the battery during each discharge, substantially as described.

17. The combination with a storage battery, of an integrating counting mechanism to measure energy supplied to the storage battery, a second integrating counting mechanism to measure energy discharged by the storage battery, motor means for operating the said integrating counting mechanisms, means whereby but one of the said integrating mechanisms is operated at a time, according to the association of the battery with the charging source of current or the translating means, to enable a comparison between the energy supplied to the battery and discharged therefrom, an indicating device for indicating the energy supplied to the battery upon each charge and the energy remaining in the battery during each discharge, and an operative connection between the said motor means and the said indicating device to effect the actuation of the indicating device, substantially as described.

18. The combination with a storage battery, of an integrating counting mechanism to measure energy supplied to the storage battery, a second integrating counting mechanism to measure energy discharged by the storage battery, motor means, having a single rotating meter element, for operating the said integrating counting mechanisms, means whereby but one of the said integrating mechanisms is operated at a time, according to the association of the battery with the charging source of current or the translating means, to enable a comparison between the energy supplied to the battery and discharged therefrom, and an indicating device for indicating the energy supplied to the battery during each charge and the energy remaining in the battery during each discharge, substantially as described.

19. The combination with a storage battery, of an integrating counting mechanism to measure energy supplied to the storage battery, a second integrating counting mechanism to measure energy discharged by the storage battery, motor means, having a single rotating meter element, for operating the said integrating counting mechanisms, means whereby but one of the said integrating mechanisms is operated at a time, according to the association of the battery with the charging source of current or the translating means, to enable a comparison between the energy supplied to the battery and discharged therefrom, an indicating device for indicating the energy supplied to the battery during each charge and the energy remaining in the battery during each discharge, and an operative connection between the said motor means and the said indicating device to effect the actuation of the indicating device, substantially as described.

20. The combination with a storage battery, of an integrating mechanism to measure energy supplied to the storage battery, a second integrating counting mechanism to measure energy discharged by the storage battery, a motor meter element receiving current passing through the storage battery, means for shifting the engagement of the said motor element from one integrating mechanism to the other, whereby but one of said integrating mechanisms is operated at a time, according to the association of the battery with the charging source of current or the translating means, to enable a comparison between the energy supplied to the battery and discharged therefrom, and an indicating element in constant engagement with the motor meter element, substantially as described.

21. The combination with a storage battery, of an integrating counting mechanism to measure energy supplied to the storage battery, a second integrating counting mechanism to measure energy discharged by the storage battery, a motor meter element receiving current passing through the storage battery, means for shifting the engagement of the said motor element from one integrating mechanism to the other, whereby but one of said integrating mechanisms is operated at a time, according to the association of the battery with the charging source of current or the translating means, to enable a comparison between the energy supplied to the battery and dischraged therefrom, an indicating element in constant engagement with the motor meter element, and means interposed between the indicating element and the motor meter element, whereby the said indicating element will operate at an increased rate of speed per unit of load or energy, while the battery is discharging, and at a decreased rate of speed per unit of load or energy while the battery is being charged, to compensate for battery loss, substantially as described.

22. The combination with a storage battery, of an integrating counting mechanism including a wheel-train to measure energy supplied to the storage battery, a second integrating counting mechanism including a wheel-train to measure energy discharged by the storage battery, a motor meter element receiving current passing through the storage battery, means for shifting the engagement of the said motor element from one of said wheel-trains to the other, whereby but one of said integrating mechanisms is operated at a time, according to the association of the battery with the charging source of current or the translating means, to enable a comparison between the energy supplied to the battery and discharged therefrom, an indicating element in engagement with the motor meter element, and gearing interposed between the indicating element and the motor meter element, whereby the said indicating element will operate at an increased rate of speed per unit of load or energy while the battery is discharging and at a decreased rate of speed per unit of load or energy while the battery is being charged, to compensate for battery loss, substantially as described.

23. The combination with a storage battery, of an integrating counting mechanism including a wheel-train to measure energy supplied to the storage battery, a second integrating counting mechanism including a wheel-train to measure energy discharged by the storage battery, a motor meter element receiving current passing through the storage battery, means for effecting engagement between the motor meter element and one of the said wheel-trains, an electromagnet for effecting engagement between the said motor meter element and the other of the said wheel-trains, and switching mechanism for closing circuit through the said electromagnet, substantially as described.

24. A storage-battery metering system having switching mechanism for connecting the storage battery with the charging-machine or translating means, the motor of a meter, two distinct counting-trains, the counting and indicating mechanisms, the bodily-movable support therefor and the electromagnetic mechanism for shifting the said support from one position to another to throw one or the other of the counting-trains into operative engagement with the motor, that are herein set forth, substantially as described.

25. A storage-battery meter having one integrating mechanism measuring the discharge of the storage battery, another integrating mechanism measuring the charge of the storage battery, a separate indicator and means for connecting the same in driving connection with one or the other of said integrating mechanisms alternately, substantially as described.

In witness whereof I hereunto subscribe my name this 27th day of June A. D. 1901.

THOMAS DUNCAN.

Witnesses:
GEORGE L. CRAGG,
HARVEY L. HANSON.